US007307623B2

(12) United States Patent
Enomoto

(10) Patent No.: US 7,307,623 B2
(45) Date of Patent: Dec. 11, 2007

(54) INFORMATION PROCESSING DEVICE HAVING DETECTOR CAPABLE OF DETECTING COORDINATE VALUES, AS WELL AS CHANGES THEREOF, OF A PLURALITY OF POINTS ON DISPLAY SCREEN

(75) Inventor: Shigeru Enomoto, Kanagawa (JP)

(73) Assignee: Sony Computer Entertainment Inc., Tokyo (JP)

( * ) Notice: Subject to any disclaimer, the term of this patent is extended or adjusted under 35 U.S.C. 154(b) by 415 days.

(21) Appl. No.: 10/374,678

(22) Filed: Feb. 26, 2003

(65) Prior Publication Data
US 2004/0021644 A1 Feb. 5, 2004

(30) Foreign Application Priority Data
Feb. 28, 2002 (JP) ............................. 2002-053833

(51) Int. Cl.
G09G 5/00 (2006.01)
(52) U.S. Cl. ....................................... 345/173; 345/156
(58) Field of Classification Search ................ 345/156, 345/173–179; 178/18.01, 18.03
See application file for complete search history.

(56) References Cited

U.S. PATENT DOCUMENTS

| 4,914,624 A | | 4/1990 | Dunthorn |
| 5,808,605 A | | 9/1998 | Shieh |
| 5,844,547 A | * | 12/1998 | Minakuchi et al. ......... 345/173 |
| 5,861,886 A | * | 1/1999 | Moran et al. ............... 345/179 |
| 6,335,722 B1 | | 1/2002 | Tani et al. |
| 2002/0018051 A1 | | 2/2002 | Singh |

FOREIGN PATENT DOCUMENTS

| EP | 0 622 722 | 11/1994 |
| JP | 59-68779 | 4/1984 |
| JP | 61-267128 | 11/1986 |
| JP | 62-198979 | 9/1987 |
| JP | 4-373084 | 12/1992 |
| JP | 5-127654 | 5/1993 |
| JP | 6-110442 | 4/1994 |
| JP | 7-160901 | 6/1995 |
| JP | 8-83144 | 3/1996 |
| JP | 8-147091 | 6/1996 |
| JP | 2000-172391 | 6/2000 |
| JP | 2000-235653 | 8/2000 |
| JP | 2002-525705 | 8/2002 |

(Continued)

OTHER PUBLICATIONS

Written Opinion, Sep. 1, 2003.

(Continued)

Primary Examiner—Regina Liang
(74) Attorney, Agent, or Firm—Katten Muchin Rosenman LLP

(57) ABSTRACT

Using a touch-panel capable of detecting coordinate values of a plurality of points, as well as changes therein, on the display screen, a data block as a target for the information processing is selected based on the coordinate values of a plurality of the points which are specified by the user on the display screen, and is then subjected to a predetermined processing. This allows the user to handle the data through an operation closely simulating actual motion in the real world.

30 Claims, 14 Drawing Sheets

FOREIGN PATENT DOCUMENTS

WO        01/98885        12/2001

OTHER PUBLICATIONS

Notification of Reason(s) for Refusal mailed Aug. 22, 2006, from corresponding Japanese Application No. 2006-026646.

Notification of Reason(s) for Refusal dated Mar. 29, 2005.

Communication pursuant to Article 96(2) EPC dated Nov. 24, 2006 for corresponding European Application EP 03 701 101.2-1527.

Notification of Reason(s) for Refusal dated Dec. 21, 2005, with translation, for corresponding Japanese Application 2002-053833.

* cited by examiner

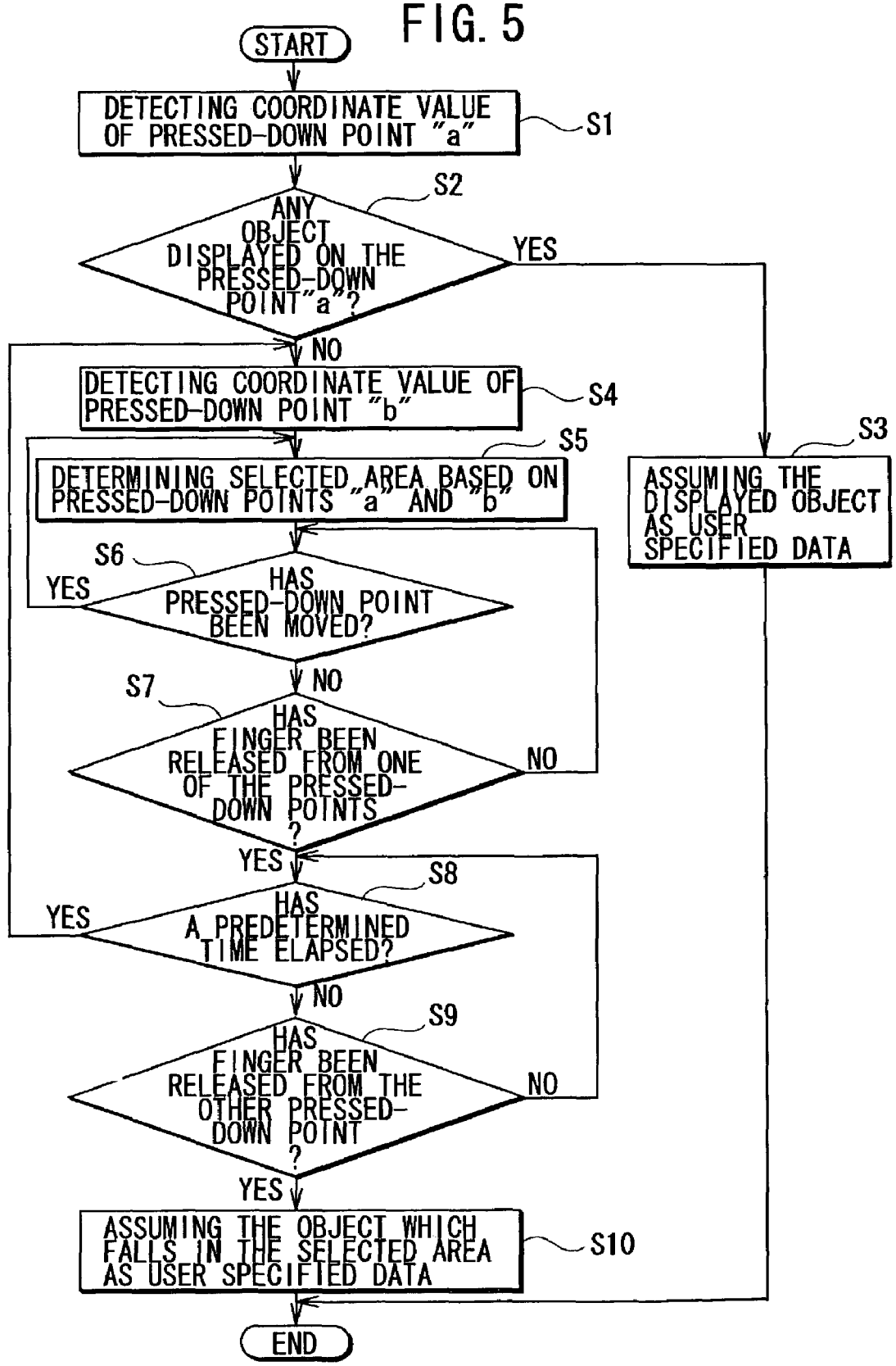

INFORMATION PROCESSING DEVICE HAVING DETECTOR CAPABLE OF DETECTING COORDINATE VALUES, AS WELL AS CHANGES THEREOF, OF A PLURALITY OF POINTS ON DISPLAY SCREEN

This application is related to Japanese Patent Application No. 2002-53833 filed on Feb. 28, 2002, based on which this application claims priority under the Paris Convention and the contents of which are incorporated herein by reference.

BACKGROUND OF THE INVENTION

1. Field of the Invention

The present invention relates to an information processing device having a detector which can detect coordinate values of a plurality of points, as well as changes thereof, on the display screen, such as a touch-panel unit, and also relates to an information processing program used therefor, a computer-readable recording medium having recorded therein an information processing program, and an information processing method.

2. Description of the Related Art

There are known touch-panels capable of recognizing coordinate values of points, as well as changes thereof, specified by the user on the display screen. Using such panel, the user can readily make a device execute various processing simply by touching the display screen through the finger or an input device following a displayed guidance output from the device. The touch-panel is thus applied to a wide variety of information processing environment in need of simple operation, examples of which include portable information processing devices such as PDA (personal digital assistants), railway ticket issuing machine and auto-teller machine at bank.

However in the information processing environment applied with the conventional touch-panels, the user has to handle data through operations which are never encountered in the real world but unique to the information processing device, which operations are typically such that specifying data by a single tap operation, and moving thereof by dragging. Thus those not fully accustomed to such data handling on the information processing device cannot readily operate the device even if the touch-panel is provided. In these years, there is thus a growing market need for an interface which can readily be operated even by those not fully accustomed to the data handling on the information processing device.

SUMMARY OF THE INVENTION

The present invention is completed in order to respond the foregoing need, and its object is to provide an information processing device which allows the user not fully accustomed to data handling on the information processing device to handle the data in a simple manner, an information processing program, a computer-readable recording medium having recorded therein the information processing program, and an information processing method.

One aspect of the present invention resides in that, using a touch-panel capable of detecting coordinate values of a plurality of points, as well as changes therein, on the display screen, a data block as a target for the information processing is identified based on the coordinate values of a plurality of points which are specified by the user on the display screen or on changes therein caused by moving operation of such plurality of points, and thus-identified data block is then subjected to a predetermined processing. This constitution typically allows the user to specify a plurality of points using a plurality of fingers and to execute information processing through an operation closely simulating actual motion in the real world, so that even those not fully accustomed to operation of the device can readily handle the data.

BRIEF DESCRIPTION OF DRAWINGS

The above and other features will be better understood from the exemplary embodiments described below, taken together with the drawings, of which:

FIG. 5 is a flow chart showing a data selection method according to a first embodiment of the present invention;

DETAILED DESCRIPTION OF THE PREFERRED EMBODIMENTS

Preferred embodiments of the present invention are described in detail below, with references made to relevant accompanying drawings.

The present invention is applicable to an information processing device having a touch-panel unit capable of detecting coordinate values of a plurality of points, as well as changes therein, on the display screen.

Constitution of Information Processing Device

Figure 1:
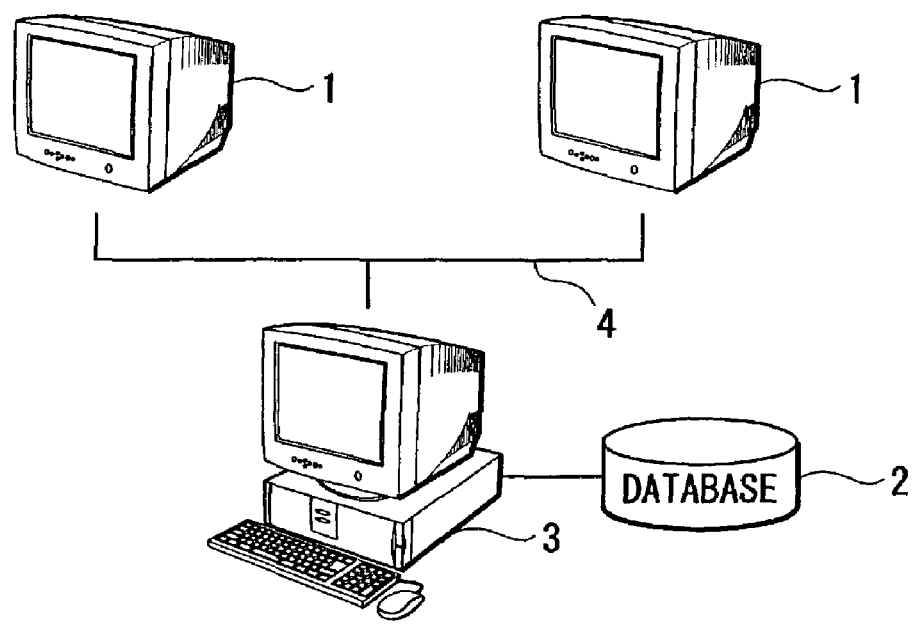
FIG. 1 is a schematic drawing of a constitution of an information processing system according to an embodiment of the present invention.

An information processing device 1 according to an embodiment of the present invention is, as shown in FIG. 1, connected via a network 4 to a server machine 3 provided with a data base 2 which has stored therein various data, which constitution allows the information processing device 1 to carry out various operation such as copying, synthesis or division of the data stored in the data base 2. The data include those having various forms such as music data and image data. The network 4 covers an entire range of communication network employing electric communication technology, which specifically includes telephone communication line, the Internet, WAN (wide area network), LAN (local area network), optical fiber communication, cable communication and satellite communication.

Figure 2:
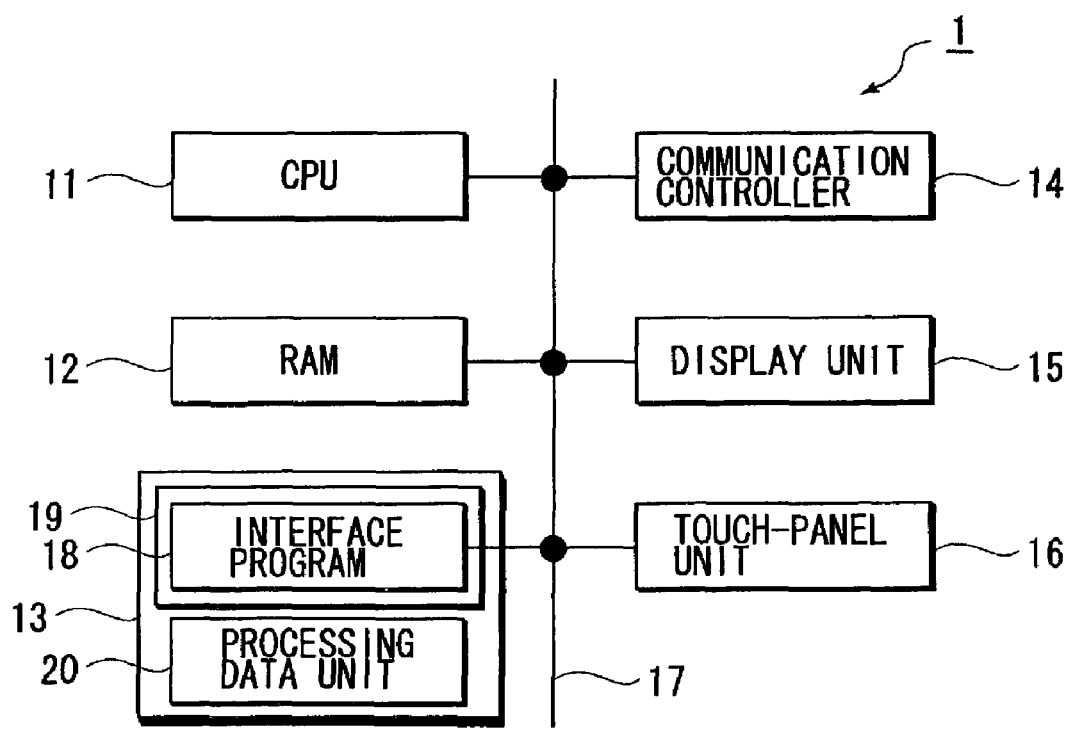
FIG. 2 is a block diagram of a constitution of the information processing system shown FIG. 1.

The information processing device 1 comprises, as shown in FIG. 2, a CPU 11, a RAM 12, a ROM 13, a communication controller 14, a display unit 15 and a touch-panel unit 16 also serves as a detector, where all of which are electrically connected with each other by a bus line 17.

The CPU 11 comprises an ordinary processor device, and controls operation of the information processing device 1 according to various programs stored in the ROM 13.

The RAM 12 comprises a volatile semiconductor memory, and provides a work area for temporarily storing programs and data which relate to processing executed by the CPU 11.

The ROM 13 comprises a non-volatile semiconductor memory, and has a program unit 19 having recorded therein various programs such as boot program for activating the information processing device 1 and interface program 18 which is used for executing the processing described later, and a processing data unit 20 having recorded therein various data necessary for executing these programs. Another possible constitution relates to that a part or entire portion of the programs to be stored in the ROM 13 is downloaded through the network 4.

The communication controller 14 controls communication processing between the information processing device 1 and the server machine 3 connected thereto via the network 4.

The display unit 15 comprises a display output device such as a liquid-crystal display or CRT (Cathode Ray Tube), and outputs various information in a displayed manner following instruction issued by the CPU 11.

The touch-panel unit 16 comprises a touch-panel capable of detecting coordinate values, as well as changes therein, of a plurality of points specified by the user on the display unit 15, and is built in, or is adhered with an adhesive to the display unit 15.

Figure 3:
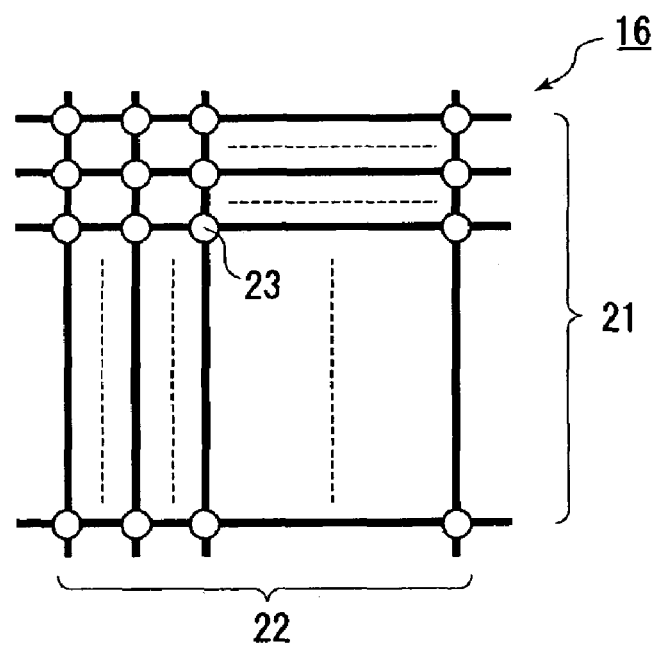
FIG. 3 is a schematic drawing of a constitution of the touch-panel unit shown in FIG. 2.

The touch-panel unit 16 specifically has, as shown in FIG. 3, a plurality of touch detection lines 21, 22 extending along the longitudinal and transverse directions, and touch keys provided at around orthogonal intersections of these touch detection lines along the longitudinal and transverse directions. The detection lines along the longitudinal and transverse directions are designed to connect with each other at the site of touch key 23 upon being pressed by the user. Detection of the coordinate values, as well as changes therein, of a plurality of points specified by the user means that the touch-panel detects connection, and position of such connection, of the touch detection lines which extend along the longitudinal and transverse directions. It should now be noted that the structure of the touch-panel unit 16 shown in FIG. 3 is only of an exemplary type, and any other structures or operational principle may be allowable in the present invention provided that they can recognize a plurality of points specified by the user.

Operation of Information Processing Device

With thus-composed information processing device 1, the user can execute various processing, through the touch-panel unit 16, of data stored in the database 2.

Selection of Data (1)

The information processing device 1 selects data in the database 2 corresponding to an operation made through the touch-panel unit 16 by the user.

Figure 4:
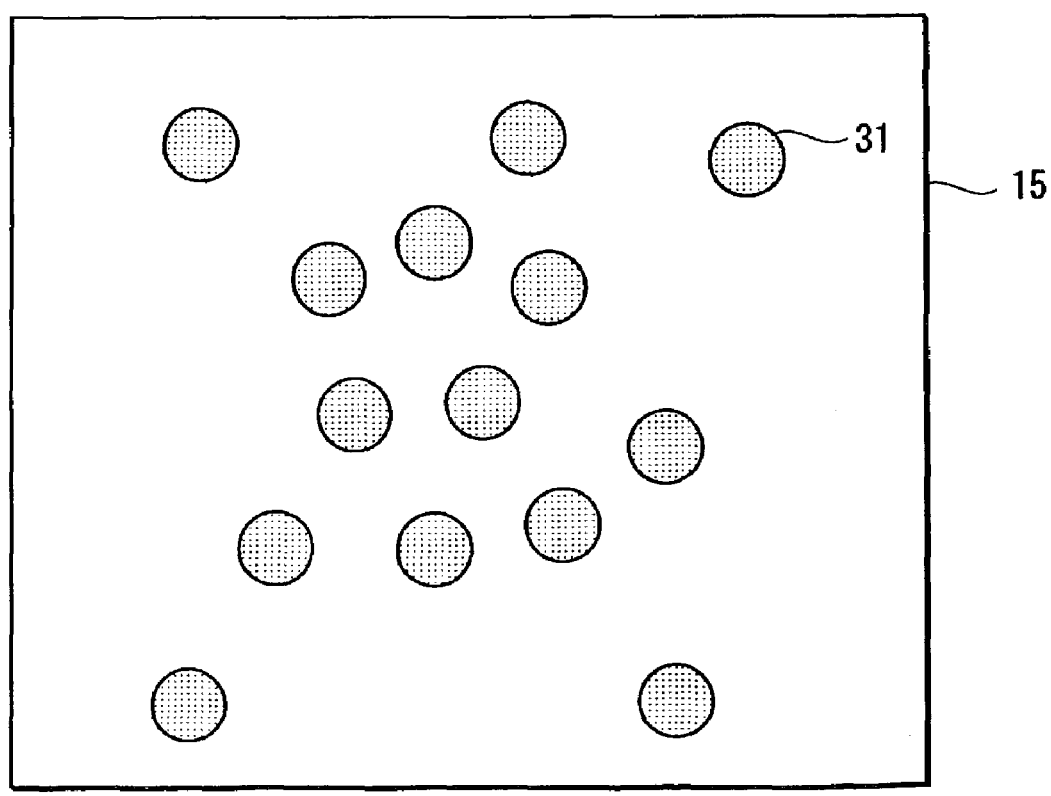
FIG. 4 is a schematic drawing showing an exemplary data displayed on the display unit shown in FIG. 1.

In the selection processing, the information processing device 1 now shows data stored in the database 2 in a style as shown in FIG. 4. In the exemplary display shown in FIG. 4, data in the database 2 are individually expressed by a plurality of spherical objects 31 arranged in a two-dimensional plane, and each object 31 has attribute information which comprises a correspondent data name and information related to its coordinate value in the two-dimensional plane. The user can select the data in the database 2 by selecting the object 31 through the touch-panel unit 16. While the above description on the present embodiment dealt with the case where the data in the database 2 is expressed by the object 31, the present invention is by no means limited thereto, and allows expression of the individual data in any other forms or styles. It is even allowable to arrange the object 31 in a three dimensional space by assigning an additional coordinate value (along the direction normal to the display screen) to the object 31.

The next paragraphs will detail, making reference to a flow chart shown in FIG. 5, operations of the information processing device 1 when the user executes the operation of selecting the data in the database 2.

The operational flow expressed by a flow chart in FIG. 5 starts when the CPU 11 detects a touch at one point on the touch-panel unit 15 effected by the user, and the CPU 11 then executes processing of step S1 according to the interface program 18 stored in the ROM 13. While the following description deals with a case where the user touches the touch-panel unit 16 with the finger, it is to be noted that the present invention is by no means limited thereto, where the user can touch the touch-panel unit 16 also using a predetermined device such as a pen-input device.

Figure 6A:
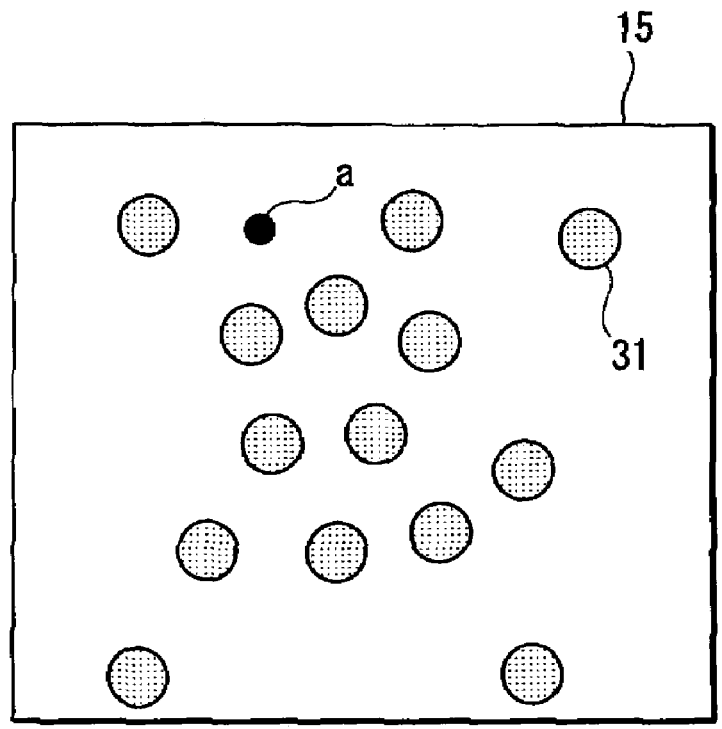
FIGS. 6A and 6B are schematic drawings showing pressed-down points effected by the user on the display unit.

In the processing of step S1, the CPU 11 detects a coordinate value of a first touch point (referred to as pressed-down point "a" hereinafter, see FIG. 6A) touched by the user through the touch-panel unit 16. This completes the processing of step S1, and the selection processing advances from a processing step of S1 to a processing of step S2.

In the processing of step S2, the CPU 11 refers the coordinate values of the pressed-down point "a" and the object 31, and determines whether the object is displayed at a position corresponded to the pressed-down point "a". If the object is found to be displayed at the position corresponded to the pressed-down point "a", the CPU 11 then assumes in step S3 data corresponded to such object as a user-specified data, and stores information on the user-specified data in the RAM 12. A series of selection processing thus completes. On the contrary, if the object is not found to be displayed at the position corresponded to the pressed-down point "a", the selection processing jumps from the processing of step S2 to a processing of step S4.

Figure 6B:
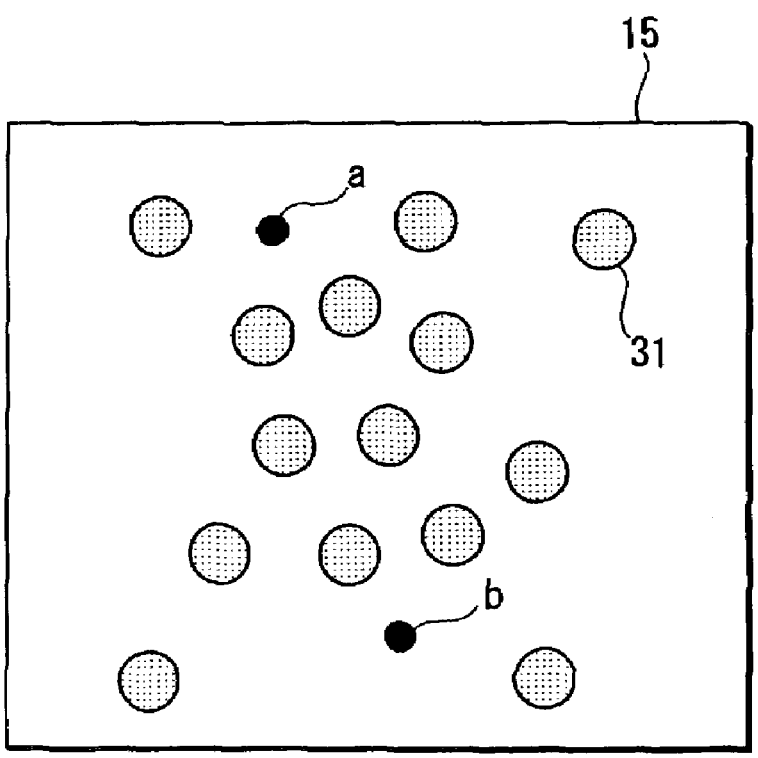

In the processing of step S4, the CPU 11 detects a coordinate value of a second touch point (referred to as pressed-down point "b" hereinafter, see FIG. 6B) effected by the user. This completes the processing of step S4, and the selection processing advances from the processing of step S4 to a processing of step S5.

Figure 7A:
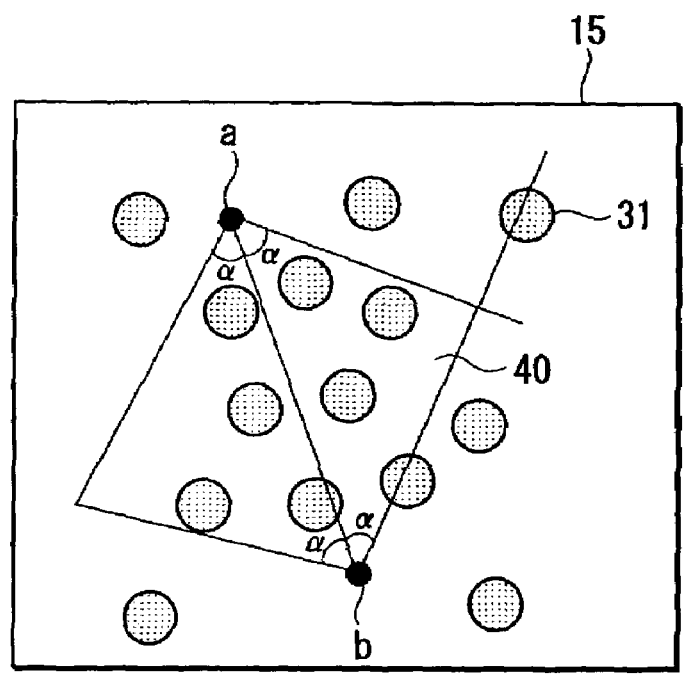
FIG. 7A is a schematic drawing showing a selected area specified by two pressed-down points on the display unit.

In the processing of step S5, the CPU 11 refers coordinate values of the pressed-down points "a" and "b", draws as shown in FIG. 7A straight line segments which extend from both pressed-down points and are oriented α degrees away from the straight line segment which connects both pressed-down points, and defines an area 40 (referred to as "selected area 40", hereinafter) surrounded by these straight line segments as an area within which the succeeding processing is executed. This completes the processing of step S5, and the selection processing advances from the processing of step S5 to a processing of step S6.

In the processing of step S6, the CPU 11 determines whether the user has moved at least either of the pressed-down points "a" and "b" while keeping the user's contact with the touch panel unit 16. If the pressed-down point was found to have moved by the user, the selection processing goes back from the processing of step S6 to the processing of step S5. On the contrary, if neither of the pressed-down points "a" and "b" was found to have moved by the user, the selection processing advances from the processing of step S6 to a processing of step S7.

Figure 7B:
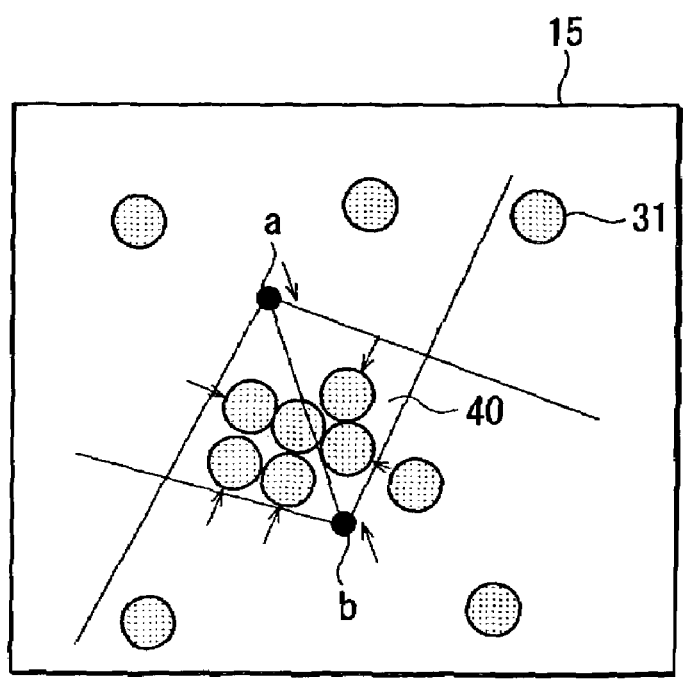
FIG. 7B is a schematic drawing explaining a status where the data moves as the size of the selected area varies.

Size of the selected area 40 will vary as the processing of steps S5 and S6 are repeated, where the CPU 11 controls the display unit 15 so as to display, as shown in FIG. 7B, the objects which fall within the first selected area as being moved. This kind of processing allows the user to manipulate the objects as if the user picks the objects with the fingers. Such mobile display of the objects is effective in particular when the distance between the pressed-down points "a" and "b" becomes shorter than the initial value.

Figure 8:
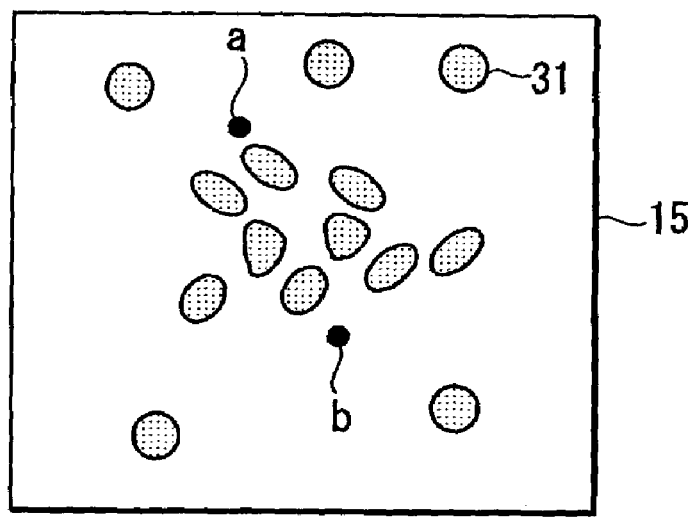
FIG. 8 is a schematic drawing explaining a status where objects deform as the size of the selected area varies.

Another strategy of mobile display of the objects which fall within the selected area 40 is such that, as shown in FIG. 8, deforming the objects so as to protrude them towards the user depending on the moving distance of the pressed-down points, which will more strongly impress the user with a "sense of picking the objects". Possible ways of deforming the objects typically include such that assuming the display screen as one texture and deforming the texture to a degree equivalent to the moving distance of the pressed-down points, and such that expressing a three-dimensional swell of the object by varying position of the object in the direction normal to the display screen.

In the processing of step S7, the CPU 11 determines whether the user released the finger from either of the pressed-down points on the touch-panel unit 16. If the finger was not found to have released from the pressed-down point, the selection processing goes back from the processing of step S7 to the processing of step S6. On the contrary, if the finger was found to have released from either of the pressed-down points "a" and "b", the selection processing advances from the processing of step S7 to processing of steps S8 and S9.

In the processing of steps S8 and S9, the CPU 11 determines whether the user released another finger from the other pressed-down point within a predetermined time period after the previous release of the finger from either of the pressed-down points. If the user's another finger was not found to have released from the other pressed-down point within a predetermined time period after the previous release of the finger from either of the pressed-down points, the CPU 11 returns the selection processing back to the processing of step S5. On the contrary, if the user's another finger was found to have released from the other pressed-down point within a predetermined time period, the CPU 11 assumes, in a processing of step S10, the data corresponded to the objects which fall within the selected area 40 as the user-specified data, and stores information on the user-specified data in the RAM 12. A series of selection processing thus completes.

Figure 9:
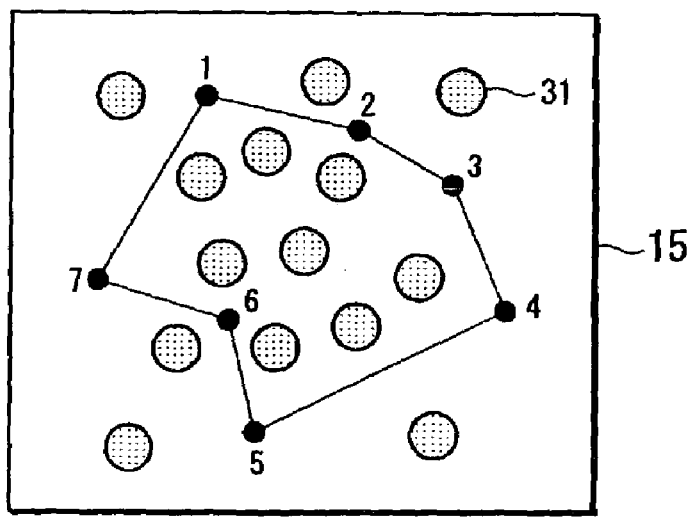
FIG. 9 is a schematic drawing explaining a modified example of the data selection method according to the first embodiment of the present invention.

While the above description dealt with the case where the selected area 40 was defined based on two points pressed on the touch-panel by the user, the selected area 40 may also be defined by connecting three or more user-specified points with straight line segments as shown in FIG. 9.

Selection of Data (2)

Figure 10:
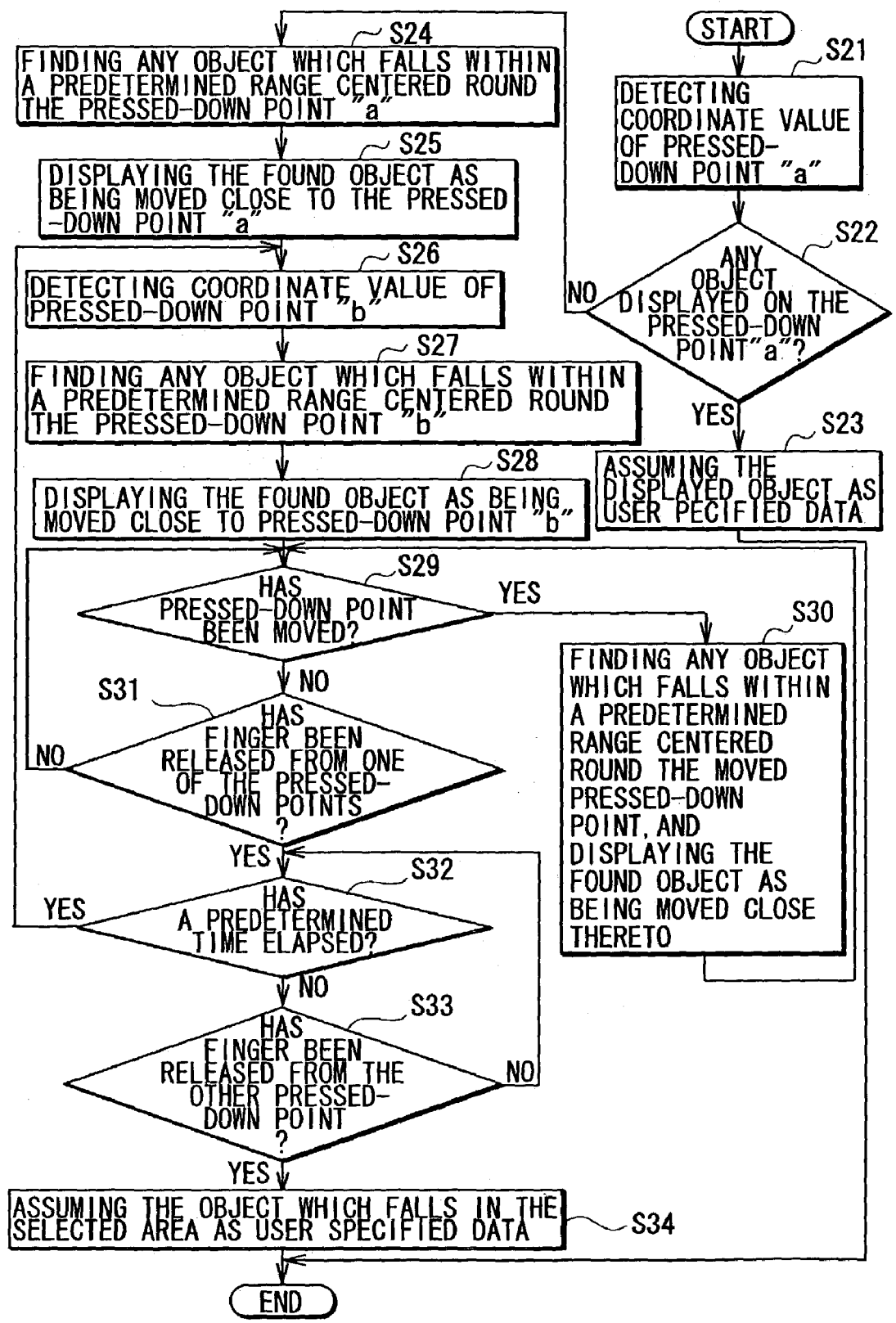
FIG. 10 is a flow chart showing a data selection method according to a second embodiment of the present invention.

The information processing device 1 can select the data in the database 2 also in accordance with user's operations which differs from those described in the above. The next paragraphs will detail, making reference to a flow chart shown in FIG. 10, operations of the information processing device 1 when the user executes the operation of selecting the data in the database 2. The description now starts from step S24 and proceeds step by step thereafter, since steps S21 to S23 in FIG. 10 are same as steps S1 to S3 in FIG. 5.

In the processing of step S24, the CPU 11 refers coordinate values of the pressed-down point "a" and of the objects, and finds the objects which fall within a predetermined range away from the pressed-down point "a". This completes the processing of step S24, and the selection processing then advances from the processing of step S24 to a processing of step S25.

Figure 11A:
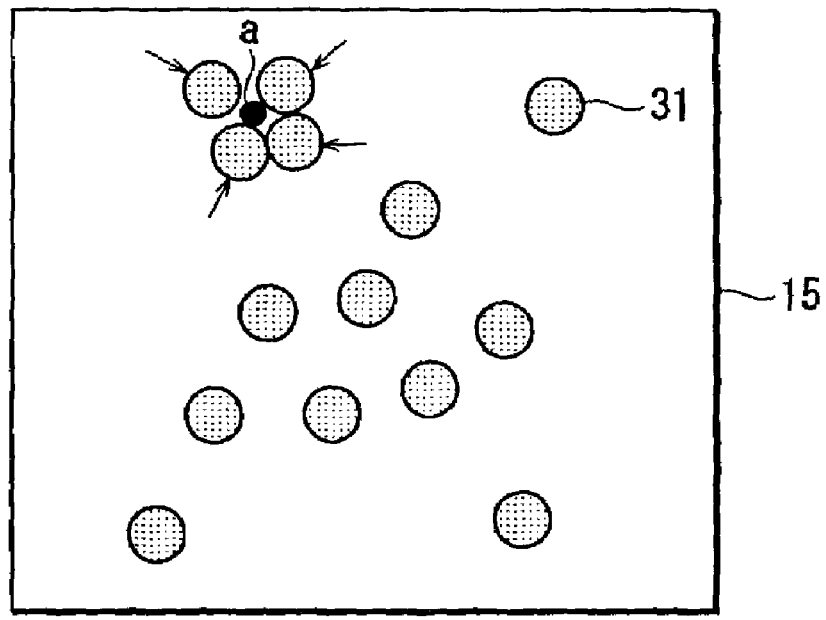
FIGS. 11A and 11B are schematic drawings explaining statuses where objects move close to pressed-down points.

In the processing of step S25, the CPU 11 controls the display unit 15 so that, as shown in FIG. 11A, the objects which fall within a predetermined range away from the pressed-down point "a" are displayed as being moved to thereby gather close to such pressed-down point "a". This completes the processing of step S25, and the selection processing then advances from the processing of step S25 to a processing of step S26.

In the processing of step S26, the CPU 11 detects the coordinate position of the pressed-down point "b". This completes the processing of step S26, and the selection processing then advances from the processing of step S26 to a processing of step S27.

In the processing of step S27, the CPU 11 refers coordinate values of the pressed-down point "b" and of the objects, and finds the objects which fall within a predetermined range away from the pressed-down point "b". This completes the processing of step S27, and the selection processing then advances from the processing of step S27 to a processing of step S28.

Figure 11B:
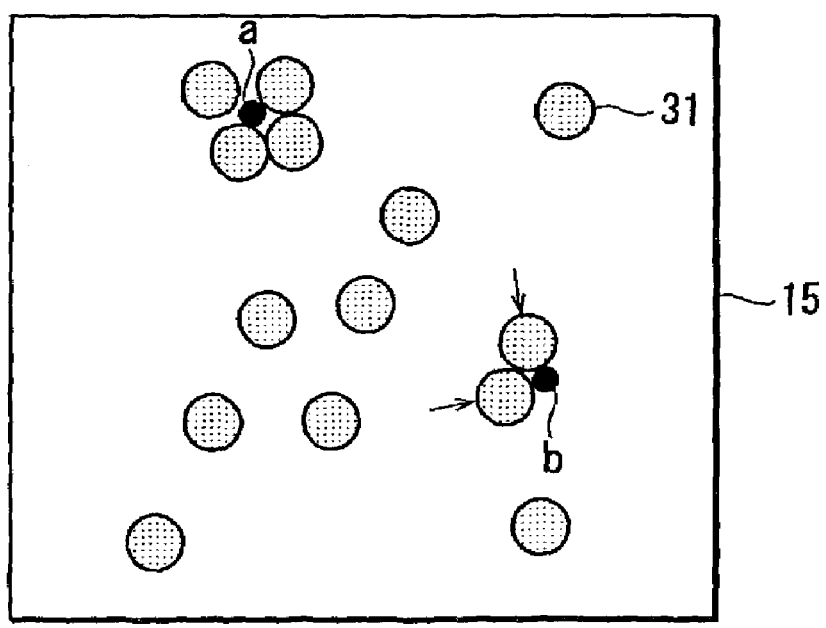

In the processing of step S28, the CPU 11 controls the display unit 15 so that, as shown in FIG. 11B, the objects which fall within a predetermined range away from the pressed-down point "b" are displayed as being moved to thereby gather. close to such pressed-down point "b". This completes the processing of step S28, and the selection processing then advances from the processing of step S28 to a processing of step S29.

In the processing of step S29, the CPU 11 determines whether the user has moved at least either of the pressed-down points "a" and "b" while keeping the user's contact with the touch panel unit 16. If neither of the pressed-down points "a" and "b" was found to have moved by the user, the selection processing advances from the processing of step S29 to a processing of step S30. On the contrary, if at least either of the pressed-down points was found to have moved by the user, the selection processing jumps from the processing of step S29 to the processing of step S31.

Figure 12:
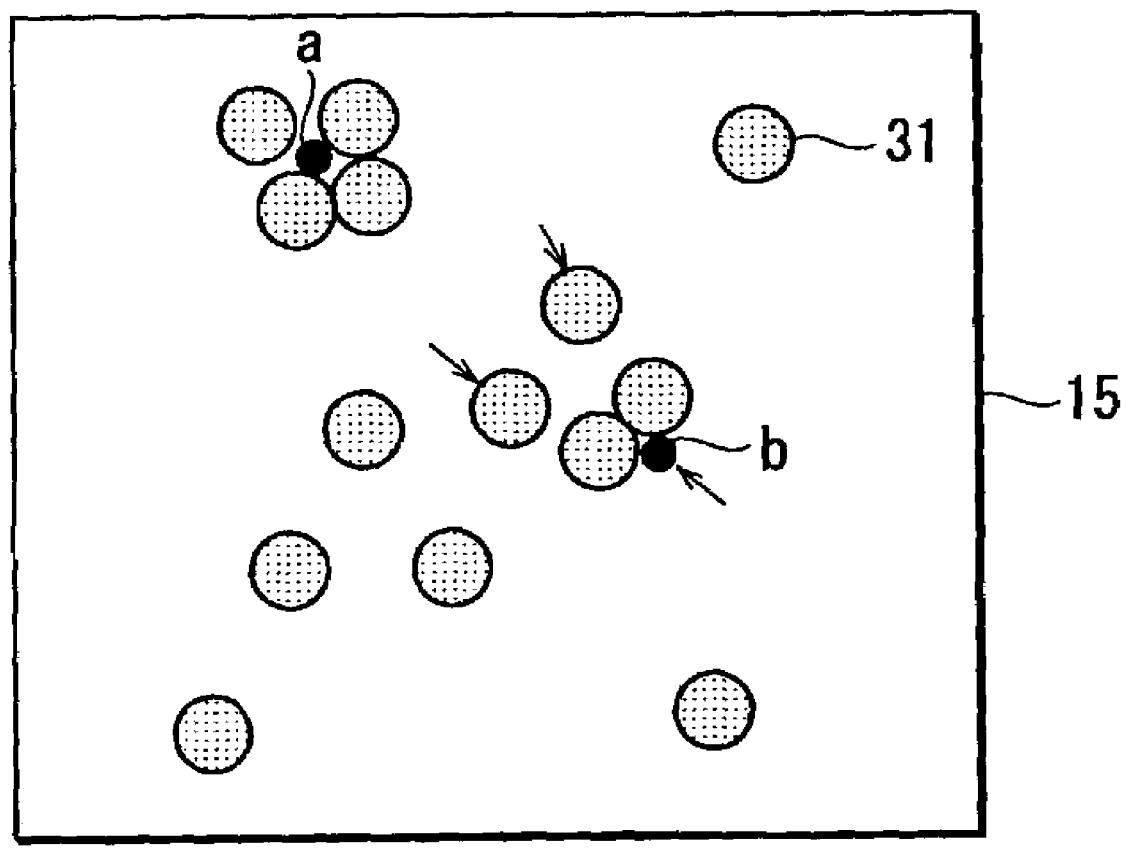
FIG. 12 is a schematic drawing explaining a status where objects move as the pressed-down point moves.

In the processing of step S30, the CPU 11 detects a locus of the moved pressed-down point, and displays, as shown in FIG. 12, the objects which fall within a predetermined range away from the moved pressed-down point (pressed-down point "b" in an exemplary case of FIG. 12) as being properly moved close to the pressed-down point. This completes the processing of step S30, and the selection processing again goes from the processing of step S30 back to the processing of step S29.

In the processing of step S31, the CPU 11 determines whether the user has released the finger from at least either of the pressed-down points "a" and "b". If the user was found to have not released the finger from neither of them, the selection processing again goes from the processing of step S31 back to the processing of step S29. On the contrary, if the user was found to have released the finger from either of the pressed-down points, the selection processing advances from the processing of step S31 to processing of steps S32 and S33.

In the processing of steps S32 and S33, the CPU 11 determines whether the user released another finger from the other pressed-down point within a predetermined time period. If the user's finger was not found to have released from the other pressed-down point within a predetermined time period, the CPU 11 returns the selection processing back to the processing of step S26. On the contrary, if the user's finger was found to have released from the other pressed-down point within a predetermined time period, the CPU 11 assumes, in a processing of step S34, the data corresponded to the objects which fall within the selected area 40 as the user-specified data, and stores information on the user-specified data in the RAM 12. A series of selection processing thus completes.

It is also allowable now in the above processing that the objects closer to the pressed-down point can gather faster and those more distant from the pressed-down point can gather slower depending on the length of the press-down time. This successfully provides a proper space between the objects closer to the pressed-down point and those more distant therefrom, which facilitates the selection operation of the objects.

While the above description dealt with the case where the information processing device 1 executes the selection processing based on two points pressed on the touch-panel by the user, the selection operation may also be executed based on three or more pressed-down points. The selection processing based on three or more pressed-down points allows the user, even for the case where unintended objects are displayed as being moved close to the pressed-down point, to bring such unintended objects away from the pressed-down point, and to execute the selection processing without retrial.

Figure 13A:
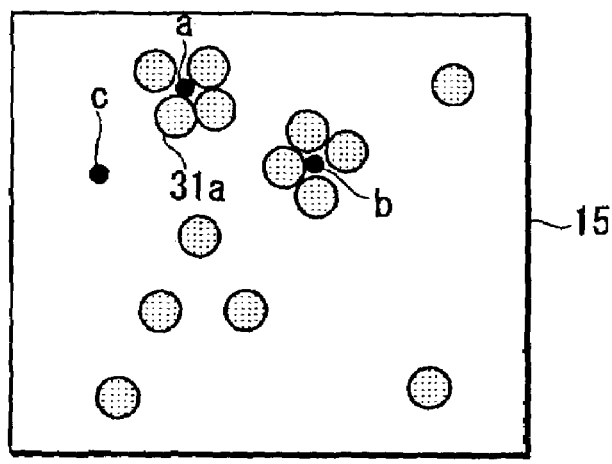
FIGS. 13A to 13C are schematic drawings explaining statuses where an unintended object in the vicinity of the pressed-down point is brought apart.
Figure 13B:
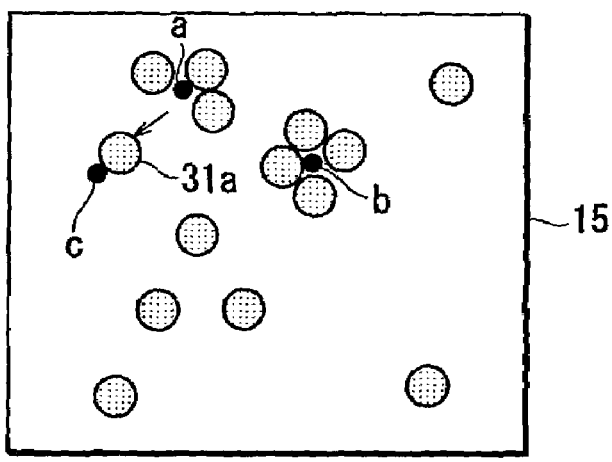
Figure 13C:
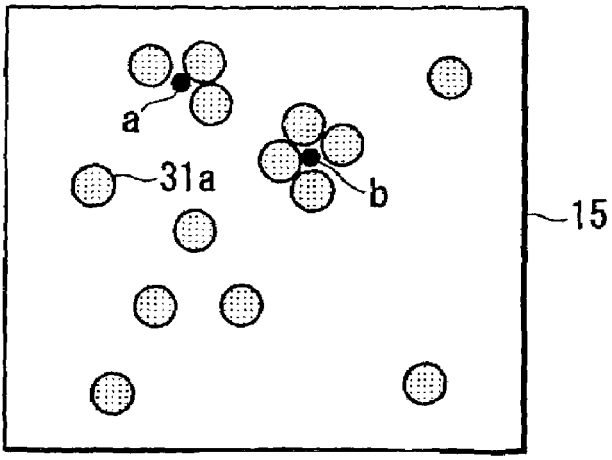

Possible processing for such case will specifically be explained referring to an exemplary case shown in FIG. 13A where an unintended object 31a is displayed as being moved close to the pressed-down point "a". In this example, the user specifies a pressed-down point "c" within a predetermined range away from the object 31a while keeping the finger touch on the pressed-down points "a" and "b". Since the CPU 11 displays the object 31a so as to move towards the pressed-down point "c", the object 31a can be brought away from the pressed-down point "a" as shown in FIG. 13B. If the user further moves the pressed-down point "c" while keeping the finger touch on the touch-panel unit 16, and then releases the finger from the pressed-down point "c", the object 31a is displayed as shown in FIG. 13C so as to be moved together with the pressed-down point "c", which can bring the object 31a further away from the pressed down point "a".

For the case where all user-specified, pressed-down points are cancelled within a predetermined time period as described in the above, execution of the selection processing will come to the end. For the case where at least one pressed-down point remains after the elapse of a predetermined time period, the selection processing will be continued based on such remaining pressed-down point. For the case where there is only one pressed-down point and such pressed-down point is cancelled, execution of the selection processing is cancelled. With the aid of such canceling operation of the selection processing the user can alter arrangement of the objects, which allows the user to execute processing such as altering the arrangement of other objects in order to facilitate selection of a desired object.

Copying of Data

The information processing device 1 can copy the data in the database 2 selected by the user according to user's operations as described below. The next paragraphs will detail, making reference to a flow chart shown in FIG. 14, operations of the information processing device 1 when the user executes operations for copying the data in the database 2.

Figure 14:
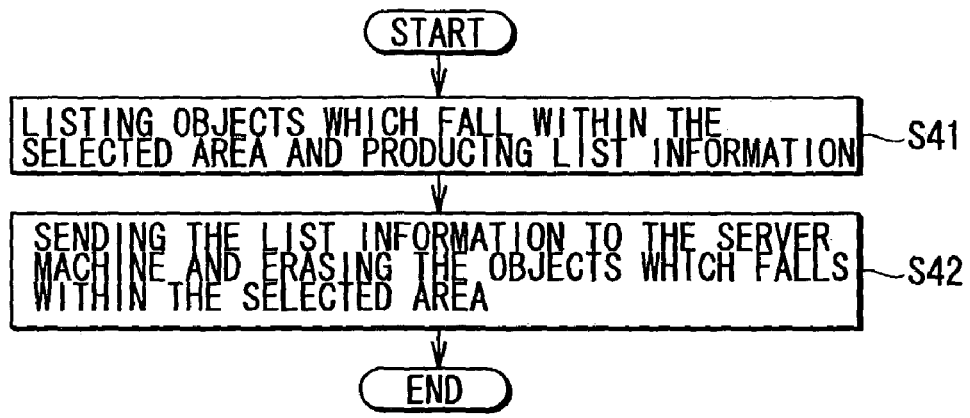
FIG. 14 is a flow chart showing a data copying method according to an embodiment of the present invention.

A flow chart shown in FIG. 14 starts when the user selects the object and specifies a destination of copying the object (data) typically by specifying a drive which appears on the display unit 15, or by pressing the touch-panel unit 16 of other information processing device 1. The copying processing then advances to a processing of step S41.

In the processing of step S41, the CPU 11 lists the objects which fall within the selected area and produces list information containing information on the listed objects. This completes the processing of step S41, and the copying processing advances from the processing of step S41 to a processing of step S42.

Figure 15:
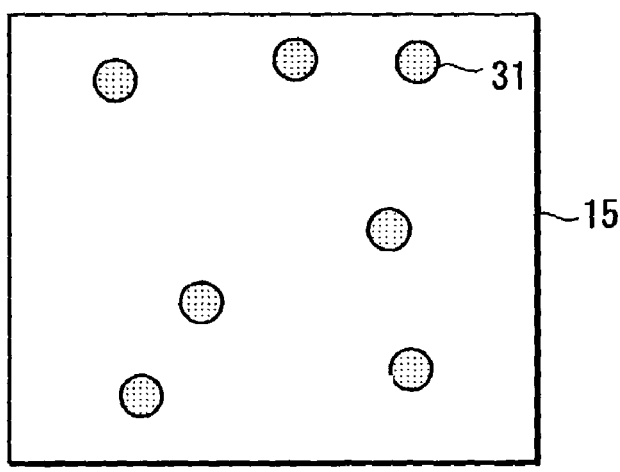
FIG. 15 is a schematic drawing explaining a status where the copied objects have vanished from the display unit.

In the processing of step S42, the CPU 11 controls the communication controller 14 so as to send thus-generated list information to the server machine 3, and then controls the display unit 15 so as to erase the displayed objects contained in the list information as shown in FIG. 15. For the case where the user specifies an operation for copying an object in the selected area to other information processing device, the server machine 3 transfers the received list information to the other information processing device. This completes the processing of step S42, and thus completes a series of copying processing.

Division of Data

The information processing device 1 can divide the data in the database 2 according to user's operations for the object as described below. The next paragraphs will detail, making reference to a flow chart shown in FIG. 16, operations of the information processing device 1 when the user executes operations for dividing the data in the database 2. In an exemplary case explained below, the information processing device 1 displays an object 33 which comprises an element "A" and an element "B" bounded on a boundary line 32 as shown in FIG. 17A, and the user divides the object 33 into the elements "A" and "B".

Figure 17A:
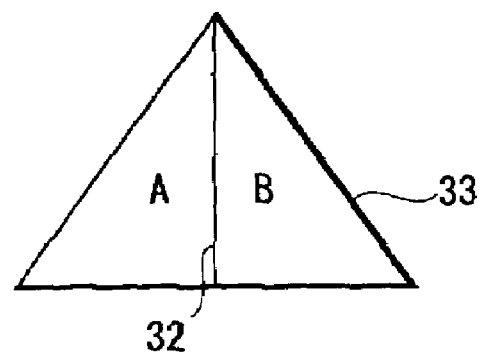
FIGS. 17A to 17C are schematic drawings explaining a data dividing method shown in FIG. 16.

The information processing device 1 normally does not display on the display unit 15 the elements composing the object, but controls the elements of the object so as to be displayed as shown in FIG. 17A only after the user selects a mode for instructing display of such elements.

Figure 16:
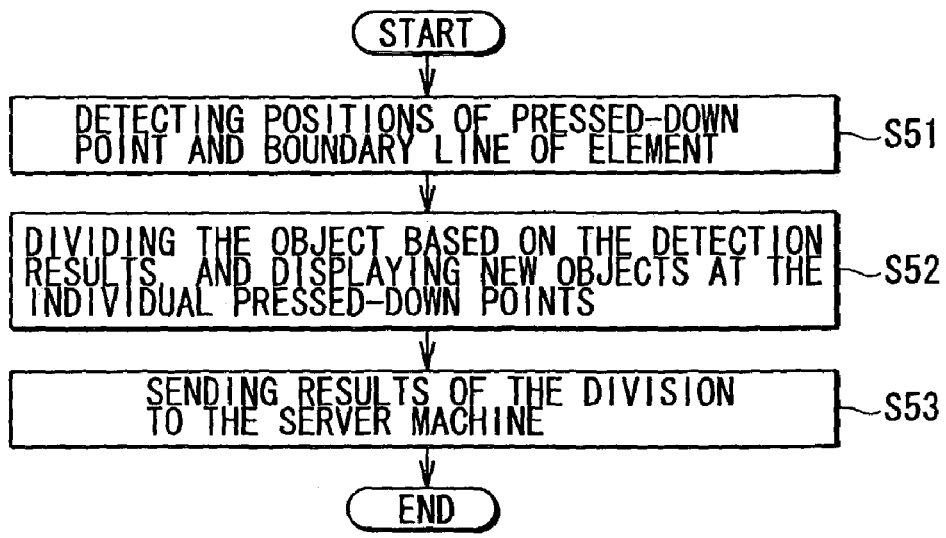
FIG. 16 is a flow chart for explaining a data dividing method according to an embodiment of the present invention.
Figure 17B:
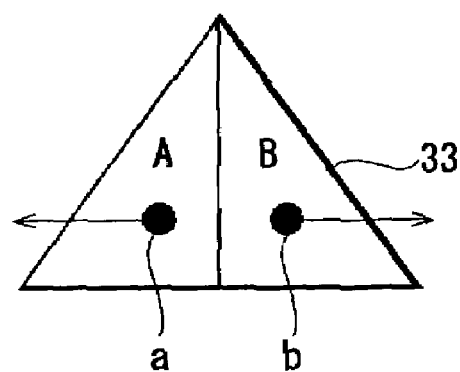

A flow chart shown in FIG. 16 starts when the user touches the areas corresponded to the elements "A" and "B", and moves the pressed-down point "a" in the element "A" and the pressed-down point "b" in the element "B" respectively in different directions as shown in FIG. 17B, while keeping the finger touch on the touch-panel unit 16, and brings the pressed-down points "a" and "b" apart by a predetermined distance. The division processing then advances to a processing of step S51.

In the processing of step S51, the CPU 11 detects positions of the pressed-down points "a" and "b", and position of the boundary line 32. This completes the processing of step S51, and the division processing advances from the processing of step S51 to a processing of step S52.

Figure 17C:
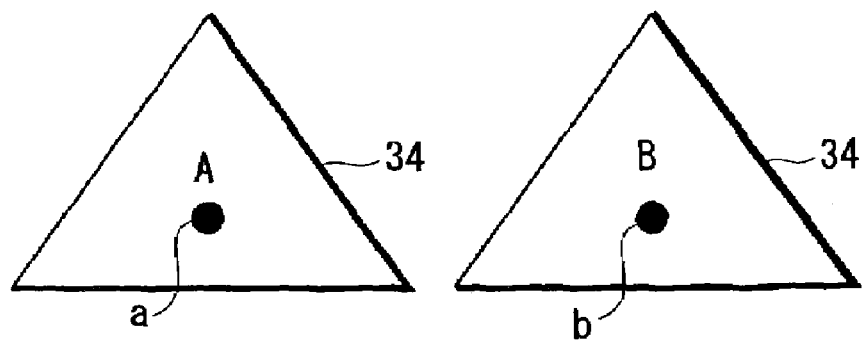

In the processing of step S52, the CPU 11 divides the object 33 with the detected boundary line 32, and controls the display unit 15 so as to output, as shown in FIG. 17C, objects 34 which respectively comprise the elements specified by the respective pressed-down points as being displayed respectively on such pressed-down points. This completes the processing of step S52, and the division processing advances from the processing of step S52 to a processing of step S53.

In the processing of step S53, the CPU 11 controls the communication controller 14 so as to send results of the division to the server machine 3, and makes such results of the division be reflected on the data in the database 2. This completes the processing of step S53, and thus completes a series of division processing.

Figure 18A:
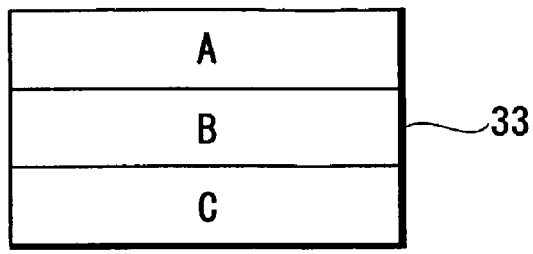
FIGS. 18A and 18B are schematic drawings explaining a modified example of the data dividing method shown in FIG. 16.
Figure 18B:
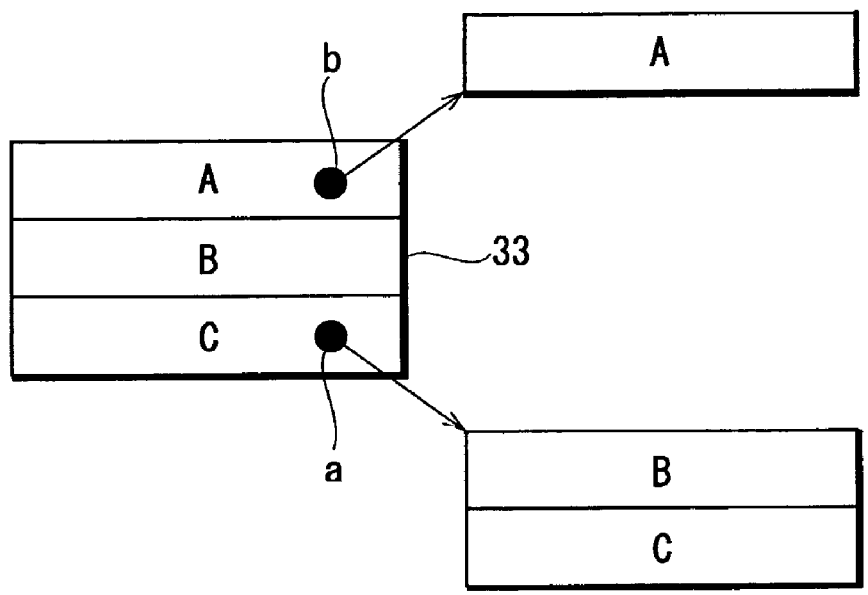

It is to be noted now that for the case where the object 33 to be divided comprises three or more elements as shown in FIG. 18A, an element having no pressed-down point is absorbed, as shown in FIG. 18B, by the element having either of the pressed-down points "a" and "b" but touched earlier (the pressed-down point "a" in this case), and element having the other pressed-down point (the pressed-down point "b" in this case) is separated to the other pressed-down point.

Synthesis of Data

The information processing device 1 can synthesize the data in the database 2 according to user's operations for the object as described below. The next paragraphs will detail, making reference to a flow chart shown in FIG. 19, operations of the information processing device 1 when the user executes operations for synthesizing the data in the database 2.

Figure 19:
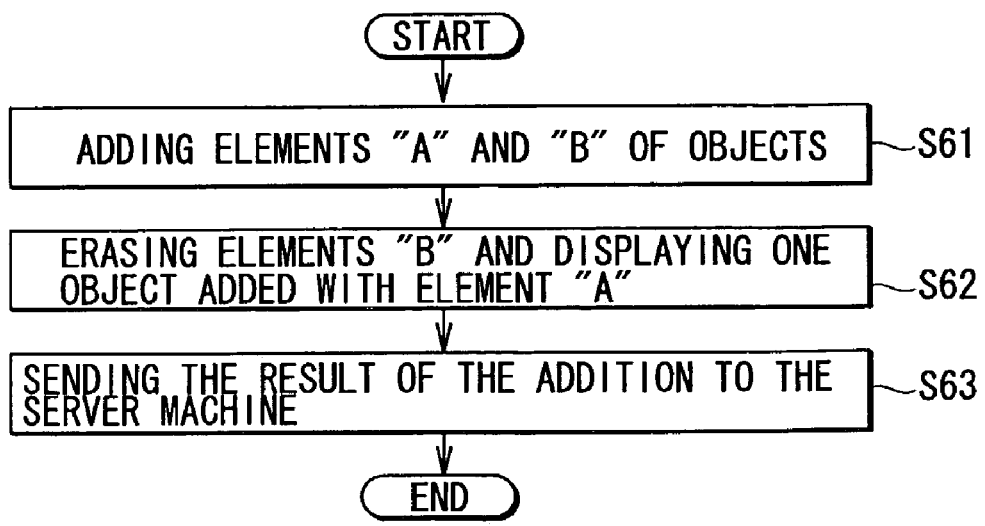
FIG. 19 is a flow chart for explaining data synthesis method according to an embodiment of the present invention.
Figure 20A:
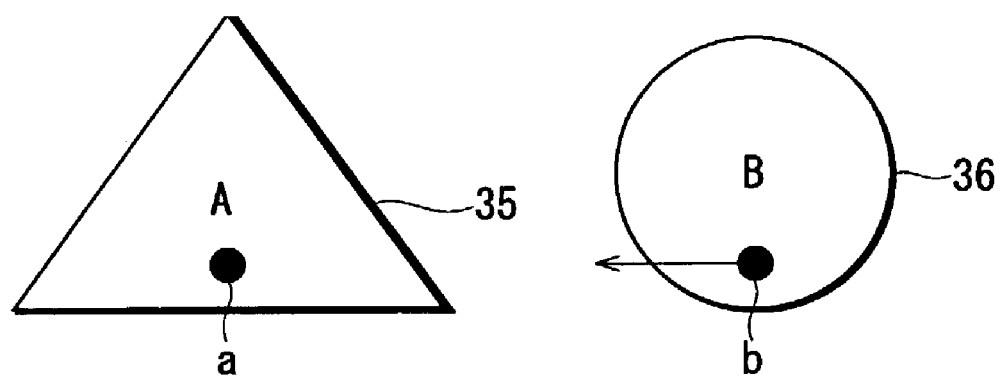
FIGS. 20A and 20B are schematic drawings for explaining the data synthesis method shown in FIG. 19.

A flow chart shown in FIG. 19 starts when the user specifies the pressed-down points "a" and "b" respectively in objects 35, 36 to be synthesized, and moves the pressed-down point "b" towards the object 35 while keeping the finger touch on the touch-panel unit 15 so as to shorten the distance between both objects to a predetermined degree. The synthetic processing then advances to a processing of step S61. It is to be noted that, in an exemplary case shown in FIG. 20A, the objects 35, 36 comprise the element "A" and "B", respectively.

In the processing of step S61, the CPU 11 adds the element "B" of the object 36 to the element "A" of the object 35. This completes the processing of step S61, and the synthetic processing then advances to a processing of step S62.

Figure 20B:
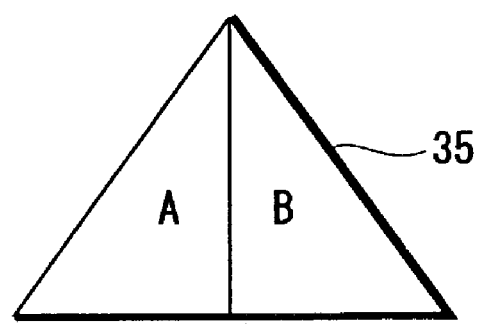

In the processing of step S62, the CPU 11 controls the display unit 15 so as to erase, as shown in FIG. 20B, the display of the object 36 specified by the later-touched, pressed-down point "b", and concomitantly displays the object 35 as being composed of the elements "A" and "B". This completes the processing of step S62, and the synthetic processing then advances to a processing of step S63.

In the processing of step S63, the CPU 11 controls the communication controller 14 so as to send results of the division to the server machine 3, and makes such results of the division be reflected on the data in the database 2. This completes the processing of step S63, and thus completes a series of synthetic processing.

As is clear from the above description, the information processing device 1 in this embodiment allows various information processing such as copying, division and synthesis through operations closely simulating motion of the user in the real world, which are exemplified as picking the data, disconnecting the data and connecting the data. This considerably improves operability in information processing, and allows the users not fully accustomed to device operation to handle the data in a simple manner.

In this embodiment, the information processing device 1 finds data which falls within a predetermined range centered round the pressed-down point, and displays the found data as being moved close to the pressed-down point, so that the user can readily select the data to be handled.

In this embodiment, the information processing device 1 displays data which falls within the selected area as being moved corresponding to movement of the pressed-down point, so that the user can handle the data as if the user picks the data with the fingers.

In this embodiment, the information processing device 1 displays, in a moving manner, data which falls within the selected area so that the objects which fall within the selected area are deformed depending on the moving distance of the pressed-down point, so that the user can handle the data as if the user picks the data with the fingers.

While the embodiment applied with the present invention completed by the present inventors has been described in the above, it should be noted that the present invention is by no means limited to this embodiment which discloses a part of the present invention through the description in the above and attached drawings. For example, while the above description dealt with the case where the coordinate values of a plurality of points specified, through the touch-panel unit 16, by the user on the display screen, and changes in the coordinate values caused by moving operation of a plurality of the points are detected, the present invention is not limited thereto, and the detection can also be effected by using infrared radiation or the like. It is to be noted that any other embodiments, examples and operational techniques derived from the above-described embodiment by those skilled in the art will of course be included in the scope of the present invention.

What is claimed is:

1. An information processing device which comprises a display unit for outputting in a displayed form a plurality of data blocks respectively having a coordinate value on the display screen and a detector for detecting coordinate values of a plurality of points designated by the user on the display screen, comprising:

an information processing unit for specifying a data block as a target for the information processing from a plurality of the data blocks based on the coordinate values of a plurality of the points, and executes a predetermined processing for the specified data block;

wherein the information processing unit specifies, as a target for the information processing, a data block which falls within an area formed by a plurality of the points;

wherein the detector detects changes in the coordinate values caused by a moving operation of a plurality of the points; and wherein the information processing unit displays the specified data block while deforming it based on changes in the coordinate values for a plurality of the points.

2. An information processing device according to claim 1, wherein:

the information processing unit displays the specified data block while moving it based on changes in the coordinate values for a plurality of the points.

3. An information processing device according to claim 1, wherein the information processing unit determines the amount of deformation of the data block depending on variation in the coordinate values.

4. An information processing device according to claim 1, wherein the information processing unit displays the data block while being deformed in a direction normal to the display screen.

5. An information processing device according to claim 1, wherein the information processing unit copies the specified data block after designation of a plurality of the points is cancelled.

6. An information processing device which comprises a display unit for outputting in a displayed form a plurality of data blocks respectively having a coordinate value on the display screen and a detector for detecting a coordinate value of a point designated by the user on the display screen, comprising:

an information processing unit for specifying a plurality of data blocks which falls within a predetermined range centered round the point as a target for the information processing from a plurality of the data blocks and displaying the specified data blocks to be moved near the point caused by a designating operation of die point.

7. An information processing device according to claim 6, wherein:

the detector detects changes in the coordinate value caused by a moving operation of the point; and the information processing unit displays the specified data block while moving it based on the change in the coordinate value for the point.

8. An information processing device according to claim 6 wherein the information processing unit copies the specified data block after designation of a plurality of the points is cancelled.

9. An information processing device which comprises a display unit for outputting in a displayed form a data block having a coordinate value on the display screen and a detector for detecting coordinate values of a plurality of points designated by the user on the display screen, and changes in the coordinate values caused by a moving operation of a plurality of the points, comprising;

an information processing unit for specifying a data block including coordinate values of a plurality of the points as a target for the information processing and dividing the specified data block into at least two data blocks as the distance between a plurality of the points reaches or exceeds a predetermined value as a result of the moving operation of a plurality of the points.

10. An information processing device which comprises a display unit for outputting in a displayed form a first data block and a second data block respectively having a coordinate value on the display screen and a detector for detecting coordinate values of two points designated by the user on the display screen and changes in the coordinate values caused by a moving operation of the two points, comprising:

an information processing unit for specifying the first data block including the coordinate value of one of the two points and the second data block including the coordinate value of the other point as a target for the information processing and synthesizing the specified data block as the distance between the two points falls to or shorter than a predetermined value as a result of the moving operation of the two points.

11. An information processing method comprising the steps of:

outputting in a displayed manner a plurality of data blocks respectively having a coordinate value on the display screen;

detecting coordinate values of a plurality of points designated by the user on the display screen;

specifying a data block as a target for the information processing from a plurality of the data blocks based on the coordinate values of a plurality of the points;

detecting changes in the coordinate values caused by a moving operation of a plurality of the points; and executing a predetermined information processing for the specified data block;

wherein the specifying step has a sub-step of specifying, as a target for the information processing, a data block which falls within an area formed by a plurality of the points; and wherein the information processing step has a sub-step of displaying the specified data block while deforming it based on changes in the coordinate values for a plurality of the points.

12. An information processing method according to claim 11, wherein the information processing step has a sub-step of displaying the specified data block while moving it based on changes in the coordinate values for a plurality of the points.

13. An information processing method according to claim 11, wherein the information processing step has a sub-step of determining the amount of deformation of the data block depending on variation in the coordinate values.

14. An information processing method according to claim 11, wherein the information processing step has a sub-step of displaying the data block while deforming it in a direction normal to the display screen.

15. An information processing method according to claim 11, further comprising copying the specified data block after designation of a plurality of the points is cancelled.

16. An information processing method comprising the steps of:

outputting in a displayed manner a plurality of data blocks respectively having a coordinate value on the display screen;

detecting a coordinate value of a point designated by the user on the display screen;

specifying a plurality of data blocks which fall within a predetermined range centered round the point as a target from a plurality of the data blocks and displaying the specified data blocks to be moved near the point.

17. An information processing method according to claim 16, wherein:
the detecting operation further includes detecting changes in the coordinate value caused by a moving operation of the point; and
the specifying operation further includes displaying the specified data block while moving it based on the change in the coordinate value for the point.

18. An information processing method according to claim 16, further comprising copying the specified data block after designation of a plurality of the points is cancelled.

19. An information processing method comprising the steps of:
outputting in a displayed manner a data block having a coordinate value on the display screen;
detecting coordinate values of a plurality of points designated by the user on the display screen, and changes in the coordinate values caused by a moving operation of a plurality of the points;
specifying a data block including coordinate values of a plurality of the points as a target for the information processing; and
dividing the specified data block into at least two data blocks as the distance between a plurality of the points reaches or exceeds a predetermined value as a result of the moving operation of a plurality of the points.

20. An information processing method comprising the steps of:
outputting in a displayed manner a first data block and a second data block respectively having a coordinate value on the display screen;
detecting coordinate values of two points designated by the user on the display screen, and changes in the coordinate values caused by a moving operation of the two points;
specifying the first data block including the coordinate value of one of the two points and the second data block including the coordinate value of the other point as a target for the information processing; and
synthesizing the specified data block as the distance between the two points falls to or shorter than a predetermined value as a result of the moving operation of the two points.

21. A computer-readable recording medium having recorded therein an information processing program executed on a computer, wherein the information processing program comprises the steps of:
outputting in a displayed manner a plurality of data blocks respectively having a coordinate value on the display screen;
detecting coordinate values of a plurality of points designated by the user on the display screen;
specifying a data block as a target for the information processing from a plurality of the data blocks based on the coordinate values of a plurality of the points;
detecting changes in the coordinate values caused by a moving operation of a plurality of the points; and
executing a predetermined information processing for the specified data block;
wherein the specifying step has a sub-step of specifying, as a target for the information processing, a data block which falls within an area formed by a plurality of the points; and
wherein the information processing step has a sub-step of displaying the specified data block while deforming it based on changes in the coordinate values for a plurality of the points.

22. A computer-readable recording medium according to claim 21,
wherein the information processing step has a sub-step of displaying the specified data block while moving it based on changes in the coordinate values for a plurality of the points.

23. A computer-readable recording medium according to claim 21, wherein the information processing step has a sub-step of determining the amount of deformation of the data block depending on variation in the coordinate values.

24. A computer-readable recording medium according to claim 21, wherein the information processing step has a sub-step of displaying the data block while deforming it in a direction normal to the display screen.

25. A computer-readable recording medium according to claim 21, further comprising copying the specified data block after designation of a plurality of the points is cancelled.

26. A computer-readable recording medium having recorded therein an information processing program executed on a computer, wherein the information processing program comprises the steps of:
outputting in a displayed manner a plurality of data blocks respectively having a coordinate value on the display screen;
detecting a coordinate value of a point designated by the user on the display screen;
specifying a plurality of data blocks which falls within a predetermined range centered round the point as a target from a plurality of the data blocks and displaying the specified data blocks to be moved near the point.

27. A computer-readable recording medium according to claim 26, wherein:
the detecting operation further includes detecting changes in the coordinate value caused by a moving operation of the point; and
the specifying operation further includes displaying the specified data block while moving it based on the change in the coordinate value for the point.

28. A computer-readable recording medium according to claim 26, further comprising copying the specified data block after designation of a plurality of the points is cancelled.

29. A computer-readable recording medium having recorded therein an information processing program executed on a computer, wherein the information processing program comprises the steps of:
outputting in a displayed manner a data block having a coordinate value on the display screen;
detecting coordinate values of a plurality of points designated by the user on the display screen, and changes in the coordinate values caused by a moving operation of a plurality of the points;
specifying a data block including coordinate values of a plurality of the points as a target for the information processing; and
dividing the specified data block into at least two data blocks as the distance between a plurality of the points reaches or exceeds a predetermined value as a result of the moving operation of a plurality of the points.

30. A computer-readable recording medium having recorded therein an information processing program executed on a computer, wherein the information processing program comprises the steps of:

outputting in a displayed manner a first data block and a second data block respectively having a coordinate value on the display screen;

detecting coordinate values of two points designated by the user on the display screen, and changes in the coordinate values caused by a moving operation of the two points;

specifying the first data block including the coordinate value of one of the two points and the second data block including the coordinate value of the other point as a target for the information processing; and synthesizing the specified data block as the distance between the two points falls to or shorter than a predetermined value as a result of the moving operation of the two points.

* * * * *